United States Patent
Lorenz et al.

(10) Patent No.: US 10,124,704 B2
(45) Date of Patent: Nov. 13, 2018

(54) VEHICLE SEAT FOR A MOTOR VEHICLE

(71) Applicant: AUDI AG, Ingolstadt (DE)

(72) Inventors: Stephan Lorenz, München (DE); Jan Buchholz, Ergolding (DE)

(73) Assignee: AUDI AG, Ingolstadt (DE)

( * ) Notice: Subject to any disclaimer, the term of this patent is extended or adjusted under 35 U.S.C. 154(b) by 78 days.

(21) Appl. No.: 14/904,311

(22) PCT Filed: Jun. 6, 2014

(86) PCT No.: PCT/EP2014/001557
§ 371 (c)(1),
(2) Date: Jan. 11, 2016

(87) PCT Pub. No.: WO2015/007358
PCT Pub. Date: Jan. 22, 2015

(65) Prior Publication Data
US 2016/0152166 A1    Jun. 2, 2016

(30) Foreign Application Priority Data

Jul. 17, 2013  (DE) .................... 10 2013 011 929

(51) Int. Cl.
*B60N 2/44* (2006.01)
*B60N 2/02* (2006.01)
(Continued)

(52) U.S. Cl.
CPC ............ *B60N 2/4415* (2013.01); *B60N 2/01* (2013.01); *B60N 2/10* (2013.01); *B60N 2/914* (2018.02);
(Continued)

(58) Field of Classification Search
None
See application file for complete search history.

(56) References Cited

U.S. PATENT DOCUMENTS 3,393,012 A * 7/1968 Chancellor, Jr. ........ A47C 7/022
                                                  297/452.51
3,713,696 A * 1/1973 Dudley .................... B60N 2/64
                                                  297/452.26
(Continued)

FOREIGN PATENT DOCUMENTS

DE    196 05 779 A1    7/1996
DE    196 49 149 A1    5/1998
(Continued)

OTHER PUBLICATIONS

International Search Report issued by the European Patent Office in International Application PCT/EP2014/001557.

*Primary Examiner* — James M Ference
*Assistant Examiner* — Kyle J. Walraed-Sullivan
(74) *Attorney, Agent, or Firm* — Henry M. Feiereisen LLC

(57) ABSTRACT

A vehicle seat for a motor vehicle, includes an adjustable seat base, an adjustable backrest surface and adjustable lateral support elements provided on the seat-side and/or the backrest-side, wherein the size or geometry of the lateral support elements, which form a pair and are opposite each other, can variously be changed, and wherein the seat base and/or the backrest surface can be tilted towards one side, electromechanical or pneumatic adjustment means being provided for this purpose.

9 Claims, 2 Drawing Sheets

(51) Int. Cl.
*B60N 2/01* (2006.01)
*B60N 2/10* (2006.01)
*B60N 2/90* (2018.01)

(52) U.S. Cl.
CPC  *B60N 2002/026* (2013.01); *B60N 2002/0212* (2013.01)

(56) References Cited

U.S. PATENT DOCUMENTS

| | | | | |
|---|---|---|---|---|
| 4,592,588 A * | 6/1986 | Isono | | A47C 7/022 297/284.11 |
| 4,655,505 A * | 4/1987 | Kashiwamura | | A47C 7/467 297/284.6 |
| 4,707,027 A * | 11/1987 | Horvath | | B60N 2/4415 297/284.6 |
| 4,792,186 A * | 12/1988 | Benjamin | | A47C 7/467 137/862 |
| 4,840,425 A * | 6/1989 | Noble | | A47C 7/467 297/284.1 |
| 4,960,304 A * | 10/1990 | Frantz | | A47C 7/021 297/284.6 |
| 4,965,899 A * | 10/1990 | Sekido | | B60N 2/665 297/284.11 |
| 5,127,708 A * | 7/1992 | Kishi | | A61B 5/18 297/284.1 |
| 5,137,333 A * | 8/1992 | Chee | | A47C 3/16 297/452.21 |
| 5,155,685 A * | 10/1992 | Kishi | | B60N 2/66 296/63 |
| 5,320,409 A * | 6/1994 | Katoh | | B60N 2/0232 297/284.6 |
| 5,758,924 A * | 6/1998 | Vishey | | A47C 7/467 297/218.1 |
| 5,860,699 A * | 1/1999 | Weeks | | A47C 7/467 297/284.1 |
| 6,037,731 A * | 3/2000 | Fruehauf | | B60N 2/0244 297/284.1 |
| 6,055,473 A * | 4/2000 | Zwolinski | | B60N 2/002 296/65.18 |
| 6,074,006 A * | 6/2000 | Milosic | | A47C 7/467 297/284.4 |
| 6,189,966 B1 * | 2/2001 | Faust | | B60N 2/5635 297/180.13 |
| 6,203,105 B1 * | 3/2001 | Rhodes, Jr. | | A47C 4/54 297/284.1 |
| 6,273,810 B1 * | 8/2001 | Rhodes, Jr. | | A47C 4/54 297/180.13 |
| 6,384,715 B1 * | 5/2002 | Potter | | A47C 7/467 340/407.1 |
| 6,682,059 B1 * | 1/2004 | Daniels | | A47C 4/54 267/131 |
| 7,152,920 B2 * | 12/2006 | Sugiyama | | B60N 2/002 297/284.1 |
| 8,740,303 B2 * | 6/2014 | Halliday | | A47C 7/462 297/284.1 |
| 2002/0047297 A1 * | 4/2002 | Longhi | | B60N 2/0224 297/284.1 |
| 2002/0056709 A1 * | 5/2002 | Burt | | A47C 4/54 219/217 |
| 2003/0038517 A1 * | 2/2003 | Moran | | B60N 2/448 297/284.3 |
| 2008/0191531 A1 * | 8/2008 | Hoffmann | | B60N 2/0284 297/284.1 |
| 2008/0265635 A1 * | 10/2008 | Scheffer | | B62J 1/007 297/201 |
| 2010/0031449 A1 * | 2/2010 | Cheng | | A61H 9/0078 5/713 |
| 2010/0139003 A1 * | 6/2010 | Moutafis | | A61G 7/05769 5/655.3 |
| 2010/0231016 A1 * | 9/2010 | Volz | | B60N 2/0244 297/217.1 |
| 2010/0289302 A1 * | 11/2010 | Cheng | | B60N 2/002 297/180.12 |
| 2012/0223554 A1 * | 9/2012 | Lem | | B60N 2/448 297/217.1 |
| 2014/0021755 A1 * | 1/2014 | Oates | | B60N 2/2806 297/219.1 |
| 2014/0232155 A1 * | 8/2014 | Bocsanyi | | A47C 4/54 297/284.6 |
| 2014/0265491 A1 * | 9/2014 | Galbreath | | B60N 2/643 297/284.1 |
| 2014/0265492 A1 * | 9/2014 | Larsen | | F16K 99/0028 297/284.1 |
| 2014/0372016 A1 | 12/2014 | Buchholz et al. | | |
| 2015/0008710 A1 * | 1/2015 | Young | | B60N 2/0276 297/217.3 |
| 2015/0015042 A1 * | 1/2015 | Willingham | | A47C 7/022 297/284.7 |
| 2015/0274106 A1 | 1/2015 | Lorenz et al. | | |
| 2015/0035323 A1 * | 2/2015 | Diop | | B60N 2/4415 297/180.14 |
| 2015/0126916 A1 * | 5/2015 | Hall | | B60N 2/448 601/149 |
| 2015/0210192 A1 * | 7/2015 | Benson | | B60N 2/505 297/217.2 |
| 2015/0375772 A1 | 12/2015 | Ulrich et al. | | |
| 2016/0059750 A1 * | 3/2016 | Lem | | B60N 2/4415 601/149 |
| 2016/0129920 A1 * | 5/2016 | Hall | | B60W 50/16 701/1 |
| 2016/0288681 A1 * | 10/2016 | Ferretti | | B60N 2/72 |

FOREIGN PATENT DOCUMENTS

| | | |
|---|---|---|
| DE | 10 2004 042 016 A1 | 3/2006 |
| DE | 10 2006 012 784 A1 | 6/2007 |
| DE | 10 2007 032 449 A1 | 1/2009 |
| WO | WO 2006/076898 A2 | 7/2006 |

\* cited by examiner

VEHICLE SEAT FOR A MOTOR VEHICLE

CROSS-REFERENCES TO RELATED APPLICATIONS

This application is the U.S. National Stage of International Application No. PCT/EP2014/001557, filed Jun. 6, 2014, which designated the United States and has been published as International Publication No. WO 2015/007358 and which claims the priority of German Patent Application, Serial No. 10 2013 011 929.4, filed Jul. 17, 2013, pursuant to 35 U.S.C. 119(a)-(d).

BACKGROUND OF THE INVENTION

The invention relates to a vehicle seat for a motor vehicle, including an adjustable seat surface, an adjustable backrest surface and on the seat and adjustable lateral support elements provided on the seat and/or the backrest.

In the future a partially autonomous or strongly assisted driving will increasingly become the focus of attention. Hereby the driver is at least partially relieved from the primary driving task in that the vehicle at least partially supports the longitudinal and transverse guidance or supports the driver in a number of driving tasks. The higher the degree of the auto-piloted driving, the less the driver is involved in the driving. This enables the driver to engage in other activities, for example increased communication with the front passenger or rear passengers, and also makes it possible to perform tasks typical for office work such as reading and writing emails or the like during the drive. The driver can also more intensely perceive and better concentrate on the running entertainment program, because the driver has to focus less on the driving task.

Because the steering wheel is situated directly in front of the driver, oftentimes only little space is available for parallel tasks such as using a laptop or the like. Also communication with the front passenger or rear passengers is difficult due to the seat orientation in the direction of the longitudinal axis of the vehicle, because the driver, when intending to face toward the front passenger or rear passengers, has to pivot substantially on the seat, which is hindered by a seat geometry which is optimized for the driving task.

SUMMARY OF THE INVENTION

The invention is thus based on the object to provide a vehicle seat, which enables assuming a changed seating position in a simple manner.

For solving this problem it is provided in a vehicle seat of the aforementioned type according to the invention that the lateral support elements which form a pair and face each other are differently adjustable regarding their size or geometry and that the seat surface and/or the backrest surface can be tilted toward a side for which electromechanical or pneumatic actuating means are provided.

The vehicle seat according to the invention thus makes it possible to adjust the seat by changing the size/geometry of the lateral support elements and spatially orienting the seat surface or the backrest so that the driver is automatically slightly "rotated" toward the center of the vehicle, i.e., so as to increasingly face the front passenger, solely based on the seating position due to the changed contour or to make it easier for the driver to rotate in the seat due to the changed contour. This leads to the fact that the driver sits quasi slightly tilted relative to the steering wheel, so that the steering wheel is no longer positioned directly in front of the driver so as to reduce space, while the driver is at the same time slightly oriented toward the front passenger, which facilitates communication toward the side and rear.

In order to achieve this, the lateral support elements on the seat and/or on the backrest can be changed in size or geometry, i.e., different form each other, which means for example that one lateral support element can for example be decreased in size while the other lateral support element is enlarged. Concretely for example the inner lateral support element, i.e., the lateral support element situated more proximate to the front passenger seat, can be decreased in size or tilted in the direction toward the passenger, while the other outer lateral support element is enlarged in order to provide better back support and to thereby also slightly rotate the driver. It is also possible to slightly tilt the outer lateral support element also in the direction of the front passenger, i.e., to change the geometry of the outer lateral support element, which also achieves a movement component toward a slightly rotated upper body position or seating position.

In addition it is conceivable to also tilt the seat surface and/or the backrest toward a side, in the case of the driver seat in the direction toward the front passenger. This is accomplished for example by elements in the region of the seat mirror and/or backrest mirror, whose volume or contour can be changed. This means that the seat surface and/or the backrest are quasi slanted relative to the longitudinal axis of the vehicle so that as a result the driver assumes a slightly "tilted" or "rotated" body posture. This is because in particular the seat surface and the backrest define the basic orientation how the driver sits or the body posture the drive assumes. For this purpose the seat surface or the backrest can be slanted or lowered on one side, so that they are tilted obliquely relative to the longitudinal axis of the vehicle.

For adjusting the lateral support elements, the seat surface and/or the backrest surface corresponding electromechanical or pneumatic actuating means are provided, for example corresponding air bellows, which can be inflated or deflated in the region of the lateral support elements or corresponding flat cushion elements, which are arranged underneath the seat surface or the backrest surface and can be displaced via corresponding electromechanical actuating means such as electric motors or the like, in order to thus shape the seat or backrest surface. The electromechanical or pneumatic actuating means are of course controlled via an appropriate control device, which is controlled by the driver—or in case the vehicle seat according to the invention is a passenger seat—by the passenger. Alternatively also an automatic, situation-dependent triggering is possible. The desired settings, i.e., the "final geometry" of the seat can be freely programmed by the user, within the maximal adjustment possibilities permitted by the actuating means or can be determined situation-dependent by the system. Thus when the driver for example pushes the corresponding button or the corresponding area on the touch screen and the like, the seat automatically moves into the corresponding position for a rotated and relaxed body position.

As described it is useful when a lateral support element of a pair can be reduced in size and the other lateral support element can be increased in size, or when both lateral support elements can be tilted into the same direction. This enables the corresponding lateral support element adjustments, which are useful for inducing a body rotation. Hereby it is advantageous when the lateral support element which is reduced in size, can be reduced significantly below the "standard size" of the lateral support element during normal driving operation, so that the reduced lateral support element, usually the inner lateral support element, no longer poses an obstacle. On the other hand it is useful when the outer lateral support element can be increased in size significantly over its "standard size" during normal driving, so that an increased-surface back support can be achieved with the strongly increased lateral support element at rotated body position.

In order to in particular enable this strong increase in size, but also in the case of the reducible lateral support element, it is useful when a cover of the lateral support element is provided with stretchable folds or can be pulled out of a reservoir against a restoring force or via a tracking unit. This is because the strong change in geometry or size of course also affects the cover of the lateral support element which also has to be able to undergo this change. This means that sufficient cover material has to be available or a sufficient elasticity has to be provided so that the cover of the lateral support element is able to follow all adjustment movements.

It is also useful when the seat surface and the backrest surface can be tilted together in the same direction. When both are tilted simultaneously in the same direction, the corresponding pivot movement is induced in the same direction in the horizontal plane (by the seat surface) as well as in the vertical plane (by the backrest), which is comfortable for the driver because he is uniformly guided over the entire seat range regarding his position.

For tilting the seat surface or the backrest surface, movable surface elements can be provided below the respective surface, which can be moved via the actuating means to accomplish the surface deformation. These surface elements push against the seat or backrest cover or corresponding foam covers and the like from below, i.e., they ultimately form the seat or backrest surface. It is also conceivable to integrate an additional support surface on the backrest rear side, which can be pivoted about an axis.

Of course it is also possible to additionally also change the seat surfaces or the backrest tilt about a horizontal axis which is perpendicular to the longitudinal axis of the vehicle, i.e., in particular to quasi pivot the backrest rearwards, which advantageously achieves an even more relaxed seating.

It is also advantageous for a relaxed seating when spring elements provided underneath the seat surface can be changed regarding their hardness, or when additional activatable elements which change the spring characteristics of the seat surface, are provided. This makes it possible to create a softer seating so that the driver "sinks into the seat surface" slightly softer and deeper. This can be accomplished by influencing the hardness of the underseat springing or by temporarily moving possible additionally activatable elements which may influence the "springability" of the seat, such as stiffening plates and stiffening rails, pneumatic elements or the like, which for this purpose can for example be spatially moved via actuating elements.

Overall the vehicle seat according to the invention makes it possible to reversibly change its shape or geometry and its hardness, so that an optimal seating position is given for the driver for the active manual drive, as well as a comfortable seating position in a (partially) autonomous drive by a corresponding change of geometry.

The invention also relates to a motor vehicle, including at least one, preferably two adjacently arranged, vehicle seats according to one of the preceding claims. Preferably at least the driver seat is equipped according to the invention. In the motor vehicle of course one or corresponding multiple spring elements are provided, which enable the corresponding seat adjustment. Because at maximal construction level the lateral support elements on the seats as wells as on the backrest and also the seat surface and the backrest can be correspondingly adjusted, wherein the driver is to be able to adjust as individually as possible, it is useful to provide separate operating elements for the respective adjustments in the form of separate operating elements positioned on a side of the lower seat trim, so that the user can perform the individual adjustments separate from each other and individually. The desired individual adjustments can then be stored and upon actuation of a corresponding button or the like be activated. The associated control device causes all actuating means to assume the corresponding position so that the desired seat geometry is set. It is also conceivable, starting from an active drive with associated seat position, to control the changed seat geometry for a (partially) autonomous drive by actuating the button. When the button is actuated again and the driving mode changes again to an active driving mode, the seat position is reversibly reset.

BRIEF DESCRIPTION OF THE DRAWING

Further advantages, features and details of the invention will become apparent form the exemplary embodiment described below and form the drawings. It is shown in.

DETAILED DESCRIPTION OF PREFERRED EMBODIMENTS

Figure 1:
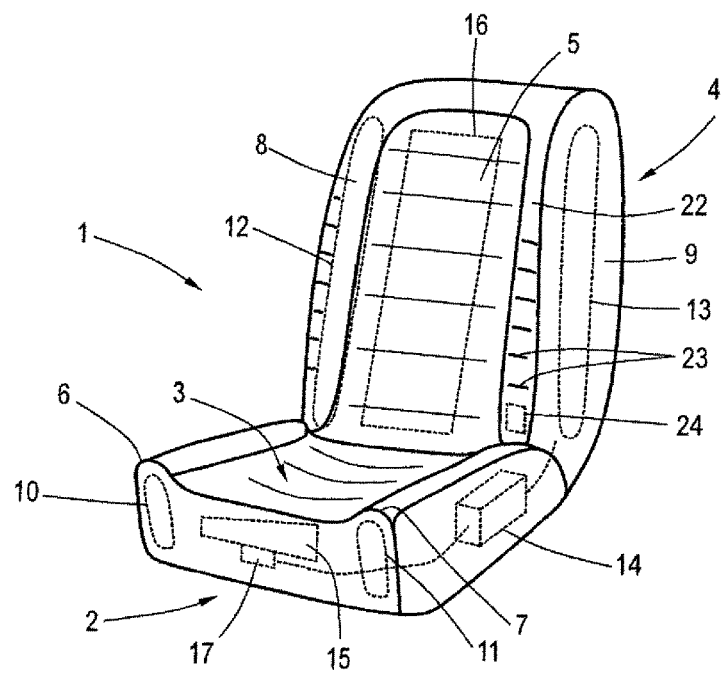
FIG. 1 a schematic representation of a vehicle seat according to the invention in its basic shape.

FIG. 1 shows a vehicle seat 1 for a motor vehicle according to the invention. It has a substantially horizontally arranged seat part 2 with a seat surface 3 and a backrest 4, which can be tilted about a horizontal axis and has a backrest surface 5.

The seat part has two lateral support elements 6, 7 whose size and/or geometry can be changed. Similarly also the backrest part 4 has two lateral support elements 8, 9, whose size and/or geometry can also be changed. In order to enable this, corresponding actuating means are provided, which in the shown exemplary embodiment are air cushions 10, 11 in the region of the lateral support elements 6, 7 or air cushions 12, 13 in the region of the lateral support elements 8, 9. Thus pneumatic actuating means are provided, which can be controlled via a corresponding control device 14, i.e., which correspondingly can be inflated or deflated via a pump.

In the shown example according to FIG. 1, the lateral support elements 6, 7 and 8, 9 are symmetrical, i.e., they have the same size or are oriented symmetrical relative to the seat surface 3 or to the backrest surface 5. This means that the corresponding air cushions 10, 11 and 12, 13 are inflated uniformly. Via the lateral support elements 6, 7 and 8,9 the person sitting on the vehicle seat 1 experiences a good side support.

The seat surface 3 and the backrest surface 5 are also changed in shape, they both face in longitudinal direction of the vehicle. They also can however be tilted relative to the longitudinal axis of the vehicle, for which purpose corresponding actuating means, here in the form of wedge-shaped support elements 15, 16 are also assigned to the seat surface 3 and the backrest surface 5, which actuating means can be moved via appropriate actuating elements 17 and can be adjusted regarding their shape and orientation and their planar position.

In the form shown in FIG. 1, the vehicle seat is configured for a usual active driving.

When the motor vehicle, in which the vehicle seat 1 is installed, is capable of a (partially) autonomous drive, which can be individually selected, the driver can further cause the vehicle seat 1 to automatically change its shape and size via the corresponding actuating means or by corresponding control of the actuating means via the control device 14, which also controls the actuating elements 17. This is exemplarily shown in FIG. 2.

Figure 2:
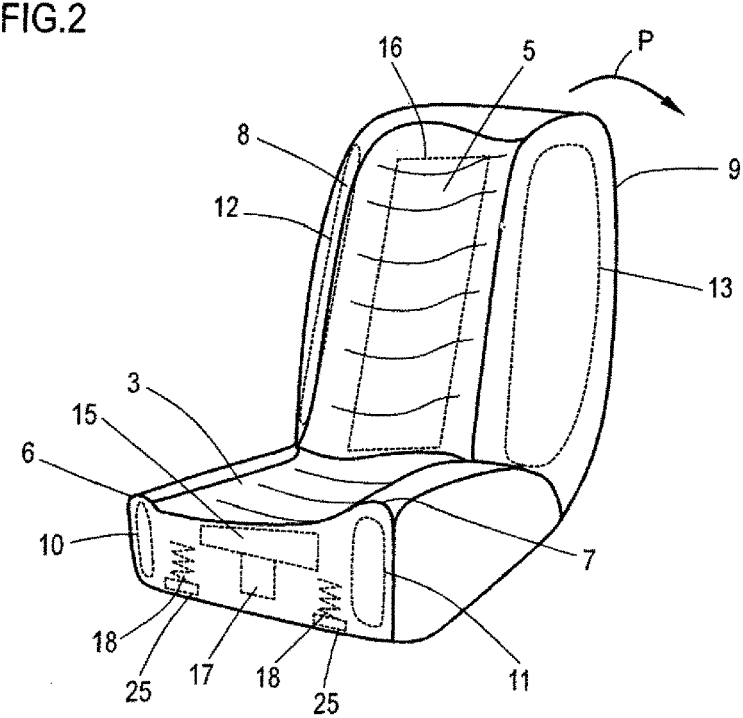
FIG. 2 the vehicle seat of FIG. 1 with differently sized lateral support elements and tilted seat and backrest surfaces, and FIG. 3 a schematic representation of a motor vehicle according to the invention with a vehicle seat according to the invention.

As shown in FIG. 2 the lateral support element 6 is significantly recued in size relative to the basic shape shown in FIG. 1. In contrast the lateral support element 7 is significantly enlarged relative to the basic shape of FIG. 1. This is accomplished in that the air cushion 10 is deflated, i.e., the air cushion 10 is significantly decreased in size, while the air cushion 11 is significantly inflated, so that the lateral support element 7 is strongly enlarged.

In parallel thereto the lateral support element 8 on the backrest 4 is also significantly reduced in size relative to the basic shape of FIG. 1, which is accomplished by discharging air from the air cushion 12. In contrast the second lateral support element 9 on the backrest is significantly enlarged, the air cushion 13 at this location is strongly inflated.

As shown in FIG. 2 the two inner lateral support elements 6 and 8 are thus strongly reduced in size while the two outer lateral support elements 7 and 9 are strongly enlarged.

At the same time the seat surface 3 and the backrest surface 5 is tilted. This is accomplished on one hand by lifting the surface element 15 via an actuating element 17, which surface element now defines the seat surface 3 or its geometry. This means that the seat cover 22 or the cushion located underneath the seat cover 22 is quasi lifted slightly and shaped by the surface element 15. As can be seen in FIG. 2 the seat surface 3 is tilted, relative to the longitudinal axis of the vehicle it would be slanted toward the longitudinal axis of the vehicle.

Correspondingly also the backrest surface 5 is tilted toward the longitudinal axis of the vehicle this is accomplished in that the wedge-shaped surface element 16 is pushed against the rear side of the backrest surface 5 via a not further shown actuating element 17, so, that the backrest surface follows the wedge surface shape of the surface element 16, i.e., both surfaces 3 and 5 are tilted toward the longitudinal axis of the vehicle.

As a result the driver overall experiences a slight rotation relative to the longitudinal axis of the vehicle. At the same time he is supported toward the rear or the outside of the vehicle via the strongly enlarged lateral support elements 7 and 9 so that on one hand the deriver overall sits comfortably on the seat and on the other hand securely slightly rotated in a defined position.

As further shown in FIG. 2 two spring elements 18 are exemplary shown underneath the seat surface 3. The spring hardness of these spring elements can be adjusted by appropriate means so that as a result the hardness of the seat springing can be varied. While the seat surface 3 is slightly sprung harder in the basic position according to FIG. 1, the seat surface 3 is sprung softer in the tilted position according to FIG. 2 so that the driver nevertheless sits comfortably.

It is noted here that FIGS. 1 and 2 are only schematic representations. Of course the corresponding surface elements 15 and 16 can be selected different regarding their shape, also multiple of these surface elements can be provided for the seat surface 3 and the backrest surface 5, which can also be individually controlled. Common to them is however that they are capable to cause the respective titling of the seat surface 3 or the backrest surface 5.

Also, instead of the air cushions 10, 11 or 12, 13 other ways can be contemplated to change the size or geometry of the lateral support elements. Conceivable are mechanical elements such as rods or the like, which can be shifted or tilted etc.

The vehicle seat is configured regarding its cover so that the cover follows the corresponding changes in geometry, i.e., does not become excessively stretched. This can be accomplished in that for example corresponding elastic sections in particular in the region of the lateral support elements which undergo significant changes in size, are provided which enable a certain elasticity of the seat cover 22, or in that a type of cover reserve is provided from which the cover is pulled out when the lateral support element is inflated, or into which it is retracted by corresponding restoring elements or elasticities and the like. The cover of the lateral support element is provided with stretchable folds 23 or can be pulled out of a reservoir against a restoring force or via a tracking unit 24. Activatable elements 25 are arranged underneath the seat surface 3 which change a spring characteristic of the seat surface 3.

Figure 3:
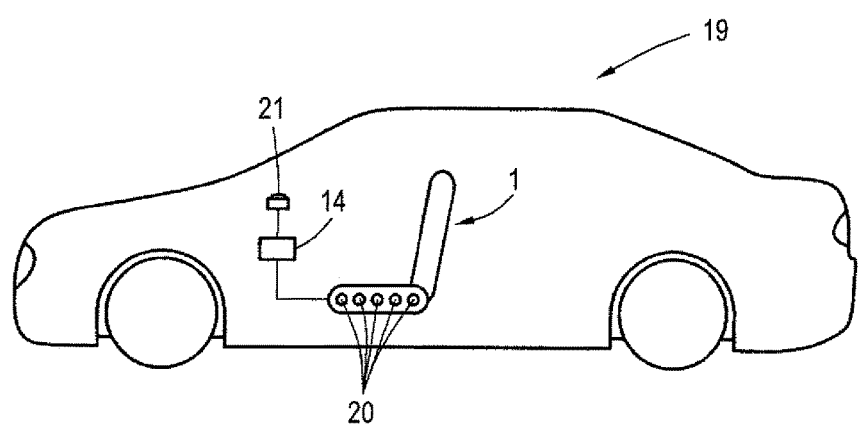

FIG. 3 exemplarily shows a schematic representation of a motor vehicle 19 according to the invention, in which exemplarily a vehicle seat 1 is installed. The vehicle seat has at its side multiple individual operating elements 20 via which individual actuating means, which are integrated in the vehicle seat, can be individually actuated. Beside the common actuating means, which serve for pivoting the backrest 4 relative to the seat 2 (as indicated by the arrow P in FIG. 2) or for moving a lumbar support and the like for lifting and lowering the seat surface etc., corresponding operating elements are provided which enable the individual setting of the lateral support elements 6, 7, 8, 9 and the seat surfaces 3 and the backrest surfaces 5 in order to be able to individually adjust a defined seat geometry as shown in FIG. 2. This can again be accomplished by a control device 14, which is here exemplarily shown external to the seat 1. When the driver desires to change the seat geometry starting from the geometry of FIG. 2 to the geometry of FIG. 3, the driver can now actuate a button 21 whereupon the control device 14 controls all actuating means assigned to the control device in order to realize the seat change, i.e., to "reshape" the driver seat from the basic shape according to FIG. 1 to the changed shape according to FIG. 2. Of course instead of the button also a control panel on a touch screen or the like can be used for the operation. A resetting to the basic shape can for example be accomplished by again actuating the button 21.

The invention claimed is:

1. A vehicle seat for a motor vehicle, comprising:
    an adjustable seat surface arranged on a longitudinal axis of the vehicle;
    an adjustable backrest surface;
    a pair of opposing lateral support elements provided on a seat and/or a backrest, said lateral support elements being adjustable in size and geometry independent of each other;
    wedge-shaped support elements provided on the seat surface and/or the backrest surface configured to tilt the seat and/or the backrest surface; and
    at least one pneumatic actuator constructed for adjusting the size or geometry of the lateral support elements; and at least one electromechanical actuator connected to the wedge-shaped support elements and constructed for tilting the seat surface and/or the backrest surface toward a side substantially perpendicular to the longitudinal axis of the vehicle.

2. The vehicle seat of claim 1, wherein one of the lateral support elements is reducible in size and another one of the lateral support elements is enlargeable.

3. The vehicle seat of claim 2, wherein the lateral support elements are tiltable in a same direction.

4. The vehicle seat of claim 2, wherein the lateral support elements comprise a cover, which is provided with stretch folds or is retrievable from a reservoir against a restoring force or via a tracking unit.

5. The vehicle seat of claim 1, wherein the seat surface and the backrest surface are tiltable together in a same direction.

6. The vehicle seat of claim 1, further comprising surface elements arranged underneath the seat surface and the backrest surface, said surface elements being movable so as to effect a deformation of the seat surface and the backrest surface via the actuator and so as to effect the tilting of the seat surface and/or the backrest surface.

7. The vehicle seat of claim 1, further comprising activatable elements arranged underneath the seat surface which change a spring characteristic of the seat surface.

8. A motor vehicle, comprising at least one vehicle seat arranged on a longitudinal axis of the vehicle, said vehicle seat comprising:
- an adjustable seat surface, an adjustable backrest surface, and a pair of opposing lateral support elements provided on a seat and/or a backrest, said lateral support elements being adjustable in size and geometry independent of each other;
- wedge-shaped support elements provided on the seat surface and/or the backrest surface configured to tilt the seat and/or the backrest surface;
- at least one pneumatic actuator constructed for adjusting the size or geometry of the lateral support elements; and
- at least one electromechanical actuator connected to the wedge-shaped support elements and constructed for tilting the seat surface and/or the backrest surface toward a side substantially perpendicular to the longitudinal axis of the vehicle.

9. The motor vehicle of claim 8, comprising two said at least one vehicle seat arranged adjacent each other.

* * * * *